(12) United States Patent
Koguchi et al.

(10) Patent No.: US 10,655,731 B2
(45) Date of Patent: May 19, 2020

(54) CONTROL DEVICE FOR CONTINUOUSLY VARIABLE TRANSMISSION AND CONTROL METHOD OF THE SAME

(71) Applicants: JATCO Ltd, Fuji-shi, Shizuoka (JP); NISSAN MOTOR CO., LTD., Yokohama-shi, Kanagawa (JP)

(72) Inventors: Takashi Koguchi, Yokohama (JP); Sho Okutani, Isehara (JP); Kenji Hishida, Isehara (JP); Makoto Komatsu, Atsugi (JP); Takuichiro Inoue, Yamato (JP); Jongkeun Lim, Anyang-si (KR); Hiroyasu Tanaka, Atsugi (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 435 days.

(21) Appl. No.: 15/559,033

(22) PCT Filed: Feb. 17, 2016

(86) PCT No.: PCT/JP2016/054520
§ 371 (c)(1),
(2) Date: Sep. 15, 2017

(87) PCT Pub. No.: WO2016/152327
PCT Pub. Date: Sep. 29, 2016

(65) Prior Publication Data
US 2018/0080546 A1    Mar. 22, 2018

(30) Foreign Application Priority Data

Mar. 26, 2015  (JP) ................................ 2015-064804

(51) Int. Cl.
*F16H 61/02* (2006.01)
*F16H 59/44* (2006.01)
(Continued)

(52) U.S. Cl.
CPC ....... *F16H 61/0213* (2013.01); *F16H 37/022* (2013.01); *F16H 59/44* (2013.01);
(Continued)

(58) Field of Classification Search
CPC ............ F16H 37/021; F16H 2037/023; F16H 2037/025; F16H 2037/026; F16H 61/662;
(Continued)

(56) References Cited

U.S. PATENT DOCUMENTS

| 2010/0248895 A1 | 9/2010 | Jozaki et al. |
| 2011/0015840 A1* | 1/2011 | Takahashi ............. F16H 61/061 701/58 |

FOREIGN PATENT DOCUMENTS

JP    2010-230116 A    10/2010

\* cited by examiner

*Primary Examiner* — Jacob S. Scott
(74) *Attorney, Agent, or Firm* — Foley & Lardner LLP

(57) ABSTRACT

As a mode switching shift line when a sub-transmission mechanism is switched from a first-speed to a second-speed, a first mode switching shift line, which prioritizes a learning of a hydraulic pressure with which a Low brake starts to slip and a learning of a hydraulic pressure with which a High clutch starts to transmit a torque, or a second mode switching shift line, which is a shift line in a Low side with respect to the first mode switching shift line and prioritizes a fuel efficiency of an engine is selected, and the sub-transmission mechanism is switched from the first-speed to the second-speed on the basis of the selected mode switching shift line.

7 Claims, 6 Drawing Sheets

(51) Int. Cl.
*F16H 61/662* (2006.01)
*F16H 37/02* (2006.01)
*F16H 61/04* (2006.01)
*F16H 59/18* (2006.01)
*F16H 61/70* (2006.01)
F16H 61/66 (2006.01)
F16H 61/00 (2006.01)

(52) U.S. Cl.
CPC ........... *F16H 61/04* (2013.01); *F16H 61/662* (2013.01); *F16H 61/702* (2013.01); *F16H 37/021* (2013.01); *F16H 59/18* (2013.01); F16H 2037/023 (2013.01); F16H 2059/183 (2013.01); F16H 2061/0015 (2013.01); F16H 2061/0087 (2013.01); F16H 2061/0227 (2013.01); F16H 2061/0459 (2013.01); F16H 2061/6614 (2013.01); F16H 2061/66277 (2013.01)

(58) Field of Classification Search
CPC ..... F16H 61/66231; F16H 2061/66204; F16H 37/66213; F16H 2061/66218; F16H 2061/66222; F16H 2061/66277; F16H 2029/183; F16H 2061/0087; F16H 2061/0227; F16H 2061/0459; F16H 2061/6614; F16H 59/18; F16H 59/44; F16H 2061/0015
See application file for complete search history.

CONTROL DEVICE FOR CONTINUOUSLY VARIABLE TRANSMISSION AND CONTROL METHOD OF THE SAME

TECHNICAL FIELD

The present invention relates to a control device for a continuously variable transmission and a control method of the same.

BACKGROUND ART

Conventionally, in a vehicle including a continuously variable transmission mechanism and a sub-transmission mechanism, a mode switching shift line, which switches a gear position of the sub-transmission mechanism from a first-speed to a second-speed that has a speed ratio smaller than the first-speed, is disposed so as to correspond to a shift line with which the sub-transmission mechanism is at the first-speed and a speed ratio of the continuously variable transmission mechanism is in a Highest (see JP2010-230116A). A through speed ratio, which is an overall speed ratio of the continuously variable transmission mechanism and the sub-transmission mechanism, changing across the mode switching shift line changes the gear position of the sub-transmission mechanism from the first-speed to the second-speed.

SUMMARY OF INVENTION

For such vehicle, setting a mode switching shift line in a Low side and changing a gear position of a sub-transmission mechanism to a second-speed at an early timing after the vehicle starts moving ensures improving a fuel efficiency. For example, a coast stop control that causes an engine to stop during traveling starts controlling under a condition where the sub-transmission mechanism is at the second-speed. Therefore, setting the mode switching shift line in the Low side increases a situation where the coast stop control is executed, thereby improving the fuel efficiency.

In a vehicle including a continuously variable transmission mechanism and the sub-transmission mechanism, when the gear position of the sub-transmission mechanism is switched from the first-speed to the second-speed, it is known to learn a hydraulic pressure with which a slippage is started in a friction engaging element that is engaged at the first-speed and a hydraulic pressure with which a torque transmission is started in a friction engaging element that is to be engaged at the second-speed. Such learning is started before the through speed ratio is changed across the mode switching shift line.

Changing the mode switching shift line in the Low side starts the above-described learning at the early timing, for example, in a state where an accelerator pedal opening is small and a vehicle speed is low. However, when the accelerator pedal opening is small and the vehicle speed is low, an engine torque is unstable, thereby a torque input to the sub-transmission mechanism being unstable. Performing the above-described learning in such state fails to accurately learn the hydraulic pressure with which the slippage is started in the friction engaging element that is engaged at the first-speed and the hydraulic pressure with which the torque transmission is started in the friction engaging element that is to be engaged at the second-speed.

The present invention has been made in view of such points, and it is an object of the present invention to improve the fuel efficiency and accurately perform the learning of the above-described hydraulic pressures.

According to an aspect of the present invention, a control device for a continuously variable transmission controls a continuously variable transmission including a continuously variable transmission mechanism configured to continuously change a speed ratio and a sub-transmission mechanism configured to select a first gear position or a second gear position having a speed ratio smaller than the first gear position by engaging or disengaging a plurality of friction engaging elements. The control device includes a selection unit that selects a first shift line or a second shift line as a shift line in switching from the first gear position to the second gear position, the first shift line prioritizing a learning of a hydraulic pressure with which a friction engaging element engaged at the first gear position starts to slip and a learning of a hydraulic pressure with which a friction engaging element engaged at the second gear position starts to transmit a torque, the second shift line being a shift line in a Low side with respect to the first shift line, the second shift line prioritizing a fuel efficiency of a driving source; and a switching unit that switches the sub-transmission mechanism from the first gear position to the second gear position on the basis of the shift line selected by the selection unit.

According to another aspect of the present invention, a control method for a continuously variable transmission, controls a continuously variable transmission including a continuously variable transmission mechanism configured to continuously change a speed ratio and a sub-transmission mechanism configured to select a first gear position or a second gear position having a speed ratio smaller than the first gear position by engaging or disengaging a plurality of friction engaging elements. The control method includes selecting a first shift line or a second shift line as a shift line in switching from the first gear position to the second gear position, the first shift line prioritizing a learning of a hydraulic pressure with which a friction engaging element engaged at the first gear position starts to slip and a learning of a hydraulic pressure with which a friction engaging element engaged at the second gear position starts to transmit a torque, the second shift line being a shift line in a Low side with respect to the first shift line, the second shift line prioritizing a fuel efficiency of a driving source; and switching the sub-transmission mechanism from the first gear position to the second gear position on the basis of the selected shift line.

According to these aspects, selecting the first shift line, which prioritizes the learning, or the second shift line, which prioritizes the fuel efficiency, as the shift line to switch from the first gear position to the second gear position ensures improving the fuel efficiency and accurately performing the learning.

DESCRIPTION OF EMBODIMENTS

The following describes an embodiment of the present invention with reference to the accompanying drawings. It should be noted that, in the following description, a "speed ratio" of a certain transmission mechanism indicates a value obtained by dividing an input rotation speed of this transmission mechanism by an output rotation speed of this transmission mechanism. A "Lowest speed ratio" is a maximum speed ratio where the speed ratio of this transmission mechanism is used, for example, when a vehicle starts to move. A "Highest speed ratio" is a minimum speed ratio of this transmission mechanism.

Figure 1:
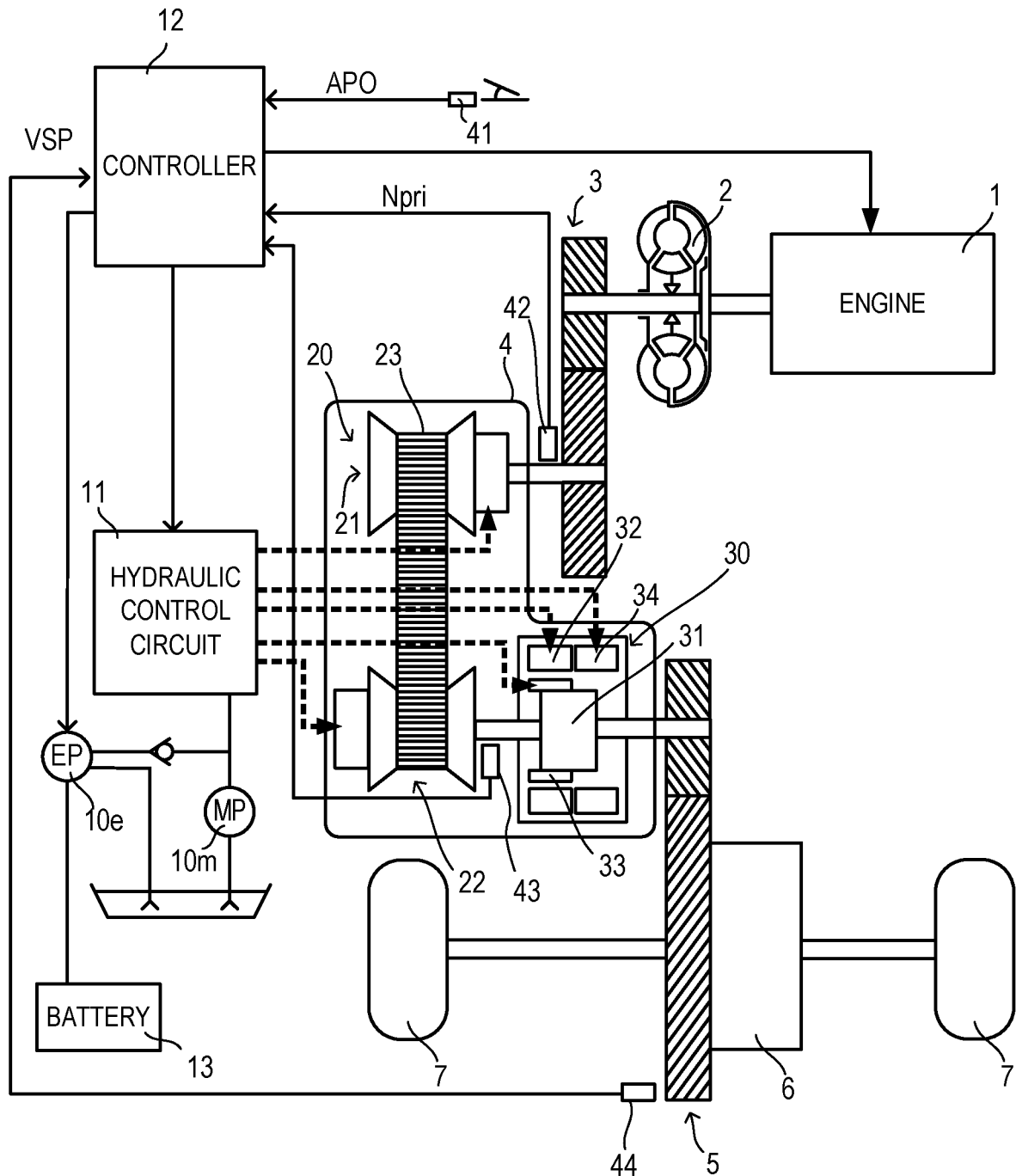
FIG. 1 is a schematic configuration diagram of a vehicle.

FIG. 1 is a schematic configuration diagram of a vehicle according to the embodiment. This vehicle includes an engine 1 as a driving source. Output rotation of the engine 1 is transmitted to driving wheels 7 via a torque converter 2 with a lock-up clutch, a first gear train 3, a continuously variable transmission (hereinafter simply referred to as a "transmission 4"), a second gear train 5, and a differential unit 6.

The transmission 4 includes a mechanical oil pump 10$m$ and an electric oil pump 10$e$. The mechanical oil pump 10$m$ is driven using some power from the engine 1 through an input of a rotation of the engine 1. The electric oil pump 10$e$ is driven by supply of electric power from a battery 13. The transmission 4 includes a hydraulic control circuit 11. The hydraulic control circuit 11 regulates hydraulic pressure generated by oil discharged from the mechanical oil pump 10$m$ or the electric oil pump 10$e$ and supplies the hydraulic pressure to respective portions in the transmission 4.

The transmission 4 includes a belt continuously variable transmission mechanism (hereinafter referred to as a "variator 20") and a sub-transmission mechanism 30, which is disposed in series with the variator 20. "Disposed in series" means that the variator 20 and the sub-transmission mechanism 30 are disposed in series in a power transmission path from the engine 1 up to the driving wheels 7. The sub-transmission mechanism 30 may be directly coupled to an output shaft of the variator 20 like this example or may be coupled via other shift and power transmission mechanisms (for example, a gear train). Alternatively, the sub-transmission mechanism 30 may be coupled to a front stage (an input shaft side) of the variator 20.

The variator 20 includes a primary pulley 21, a secondary pulley 22, and a V belt 23, which is stretched between the pulleys 21 and 22. The variator 20 continuously changes the speed ratio by supplying and draining the hydraulic pressure to/from the primary pulley 21 and the secondary pulley 22.

The sub-transmission mechanism 30 is a transmission mechanism having two stages for forward and one stage for backward. The sub-transmission mechanism 30 includes a Ravigneaux planetary gear mechanism 31 and a plurality of friction engaging elements (a Low brake 32, a High clutch 33, and a Rev brake 34). The Ravigneaux planetary gear mechanism 31 couples carriers of two planetary gears. The friction engaging elements are coupled to a plurality of rotating elements constituting the Ravigneaux planetary gear mechanism 31 to change a linking state of these elements. Adjusting the hydraulic pressure supplied to the respective friction engaging elements 32 to 34 to change an engaging or a disengaging state of the respective friction engaging elements 32 to 34 changes a gear position of the sub-transmission mechanism 30. In the following description, a state that the gear position of the sub-transmission mechanism 30 is at a first-speed is expressed in that "the transmission 4 is in a low-speed mode," and a state that the gear position of the sub-transmission mechanism 30 is at a second-speed is expressed in that "the transmission 4 is in a high-speed mode." Switching of the gear position from the first-speed to the second-speed of the sub-transmission mechanism 30 in a state where an accelerator pedal is depressed by a driver progresses in the order from a preparation phase, a torque phase, an inertia phase, and a termination phase.

In the preparation phase, precharging of the hydraulic pressure to the High clutch 33 is performed and the High clutch 33 is caused to wait in a state immediately before an engagement. In the torque phase, the hydraulic pressure supplied to the Low brake 32 is decreased and the hydraulic pressure supplied to the High clutch 33 is increased to transfer the friction engaging element, which takes a torque transmission role, from the Low brake 32 to the High clutch 33. In the inertia phase, the speed ratio changes from a speed ratio at a gear position before shifting to a speed ratio at a gear position after the shifting. In the termination phase, the hydraulic pressure supplied to the Low brake 32 is set to zero to completely disengage the Low brake 32 and the hydraulic pressure supplied to the High clutch 33 is increased to completely engage the High clutch 33.

Figure 2:
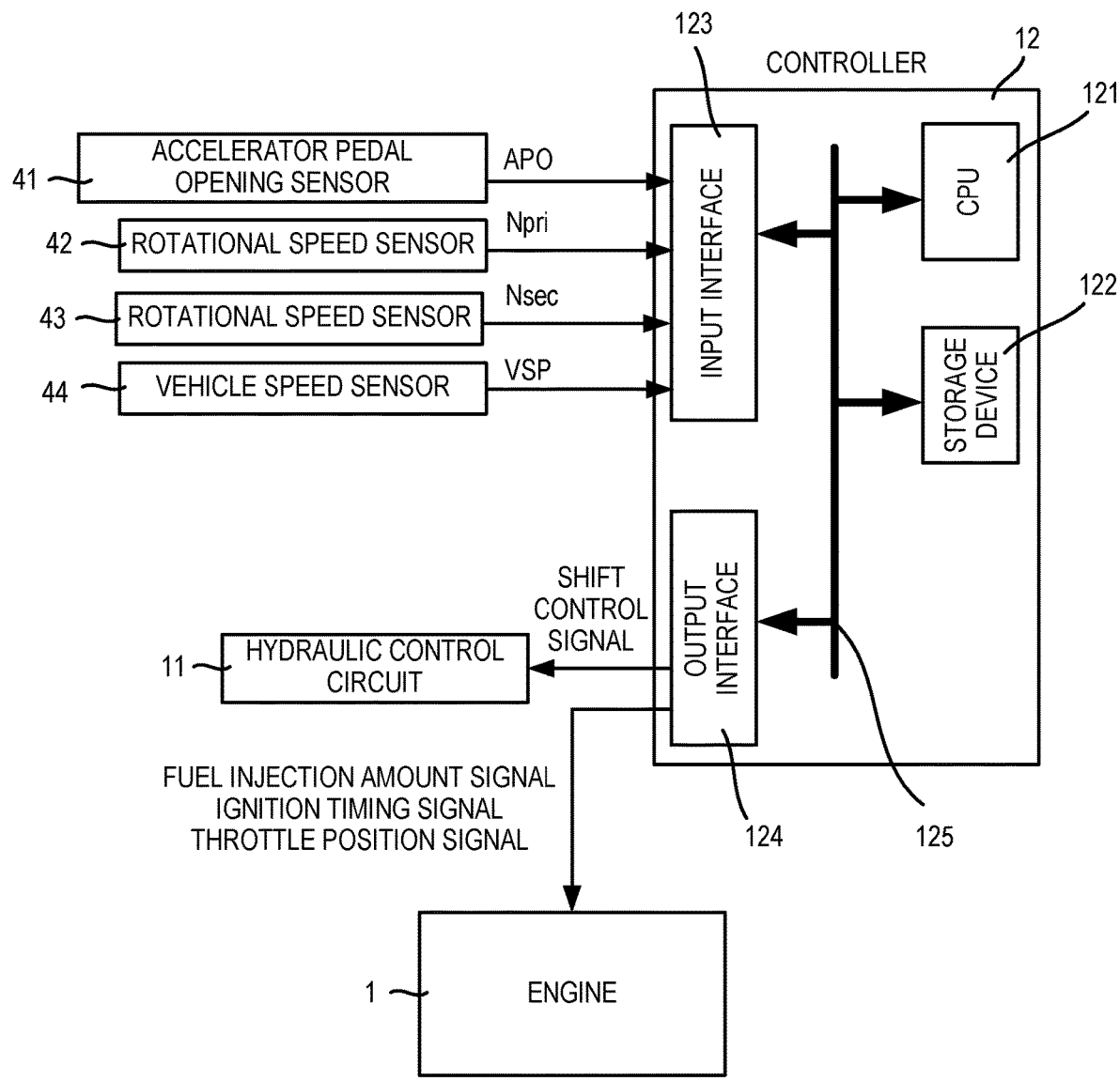
FIG. 2 is a schematic configuration diagram of a controller.

A controller 12 is a controller that integrally controls the engine 1 and the transmission 4. As illustrated in FIG. 2, the controller 12 includes a CPU 121, a storage device 122 constituted of a RAM and a ROM, an input interface 123, an output interface 124, and a bus 125, which couples these to one another.

To the input interface 123, an output signal from an accelerator pedal opening sensor 41, which detects an accelerator pedal opening APO, a manipulated variable of an accelerator pedal, an output signal from a rotational speed sensor 42, which detects an input rotation speed of the transmission 4 (=a rotation speed of the primary pulley 21, hereinafter referred to as a "primary rotation speed Npri"), an output signal from a rotational speed sensor 43, which detects an output rotation speed of the transmission 4 (=a rotation speed of the secondary pulley 22, hereinafter referred to as a "secondary rotation speed Nsec"), an output signal from a vehicle speed sensor 44, which detects a vehicle speed VSP, etc. are input.

The storage device 122 stores a control program for the engine 1, a shift control program for the transmission 4, and various maps and tables used for these programs. The CPU 121 reads and runs the programs stored in the storage device 122, performs various operation processes on various signals input through the input interface 123, creates a fuel injection amount signal, an ignition timing signal, a throttle position signal, a shift control signal, a drive signal for the electric oil pump 10$e$, etc., and outputs the created signals to the engine 1, the hydraulic control circuit 11, and a motor driver of the electric oil pump 10$e$ through the output interface 124. The storage device 122 appropriately stores various values used for the operation processes by the CPU 121 and the results of the operation.

The hydraulic control circuit 11 is constituted of a plurality of flow passages and a plurality of hydraulic control valves. The hydraulic control circuit 11 controls the plurality of hydraulic control valves to switch a supply passage for hydraulic pressure on the basis of a shift control signal from the controller 12. Additionally, the hydraulic control circuit 11 prepares required hydraulic pressure from the hydraulic pressure generated by oil discharged from the mechanical oil pump 10m or the electric oil pump 10e and supplies this hydraulic pressure to the respective portions of the transmission 4. This changes the speed ratio of the variator 20 and the gear position of the sub-transmission mechanism 30, shifting the transmission 4.

Figure 3:
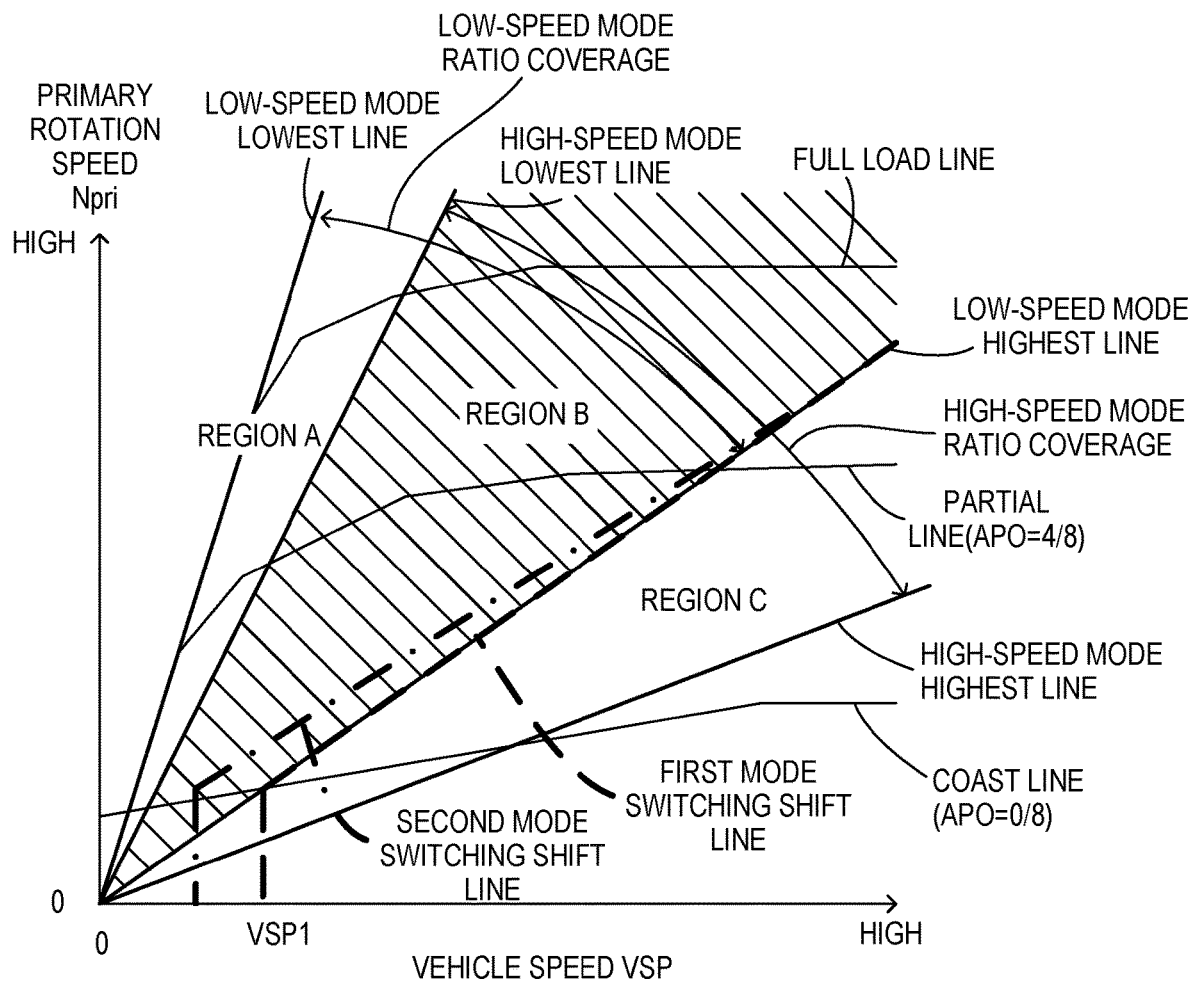
FIG. 3 is a shift map stored in a storage device.

FIG. 3 is an exemplary shift map stored in the storage device 122. The controller 12 controls the variator 20 and the sub-transmission mechanism 30 corresponding to a vehicle operating state (in this embodiment, the vehicle speed VSP, the primary rotation speed Npri, and the accelerator pedal opening APO) on the basis of this shift map.

In this shift map, an operating point of the transmission 4 is defined by the vehicle speed VSP and the primary rotation speed Npri. A slope of a line (an angle from a horizontal axis indicating the vehicle speed VSP) coupling the operating point of the transmission 4 to a zero point at a lower-left corner of the shift map is corresponding to a speed ratio (an overall speed ratio obtained by multiplying the speed ratio of the variator 20 by the speed ratio of the sub-transmission mechanism 30, hereinafter referred to as a "through speed ratio") of the transmission 4. In this shift map, similarly to a shift map of a conventional belt continuously variable transmission, shift lines are set by the accelerator pedal opening APO. The shift of the transmission 4 is performed in accordance with the shift line selected corresponding to the accelerator pedal opening APO. It should be noted that, in FIG. 3, only a full load line (the shift line when the accelerator pedal opening APO=8/8), a partial line (the shift line when the accelerator pedal opening APO=4/8), and a coast line (the shift line when the accelerator pedal opening APO=0/8) are illustrated for simplicity.

When the transmission 4 is in the low-speed mode, the transmission 4 can be shifted between a low-speed mode Lowest line obtained such that the speed ratio of the variator 20 is changed to the Lowest speed ratio, and a low-speed mode Highest line obtained such that the speed ratio of the variator 20 is changed to the Highest speed ratio. In this case, the operating point of the transmission 4 moves within Region A and Region B. On the other hand, when the transmission 4 is in the high-speed mode, the transmission 4 can be shifted between a high-speed mode Lowest line obtained such that the speed ratio of the variator 20 is changed to the Lowest speed ratio, and a high-speed mode Highest line obtained such that the speed ratio of the variator 20 is changed to the Highest speed ratio. In this case, the operating point of the transmission 4 moves within Region B and Region C.

The speed ratios at respective gear positions of the sub-transmission mechanism 30 are set such that the speed ratio corresponding to the low-speed mode Highest line (the low-speed mode Highest speed ratio) is smaller than the speed ratio corresponding to the high-speed mode Lowest line (the high-speed mode Lowest speed ratio). This causes a range of a through speed ratio that the transmission 4 possibly takes in the low-speed mode (a "low-speed mode ratio coverage" in the drawing) and a range of a through speed ratio that the transmission 4 possibly takes in the high-speed mode (a "high-speed mode ratio coverage" in the drawing) to partially overlap to allow the transmission 4 to select any mode of the low-speed mode and the high-speed mode when the operating point of the transmission 4 is in Region B, which is sandwiched between the high-speed mode Lowest line and the low-speed mode Highest line.

In this embodiment, as a mode switching shift line with which the transmission 4 is shifted corresponding to the vehicle operating state, a first mode switching shift line (a first shift line) or a second mode switching shift line (a second shift line) are selectable.

The first mode switching shift line is set so as to overlap over the low-speed mode Highest line in a region where the vehicle speed VSP is equal to or more than a first predetermined vehicle speed VSP1. Thus setting the first mode switching shift line is because the smaller the speed ratio of the variator 20 is, the smaller an input torque to the sub-transmission mechanism 30 becomes, and a shift shock when the gear position is switched in the sub-transmission mechanism 30 can be suppressed.

The second mode switching shift line is set to a Low side with respect to the first mode switching shift line. Thus setting the second mode switching shift line is to easily execute a coast stop control that is started under a condition where, for example, the gear position of the sub-transmission mechanism 30 is at the second-speed. The coast stop control is a control to automatically stop the engine 1 while the vehicle is traveling. Executing the coast stop control reduces a fuel injection to the engine 1, thereby ensuring improving a fuel efficiency. When the accelerator pedal is not depressed during the traveling and the transmission 4 is changed from the low-speed mode to the high-speed mode, a fuel cut is inhibited in order to prevent the engine rotation speed from decreasing. In contrast to this, shifting the gear position of the sub-transmission mechanism 30 to the second-speed in an early stage restrains the fuel cut from being inhibited when the accelerator pedal is not depressed during the traveling, thereby ensuring improving the fuel efficiency.

When the operating point of the transmission 4 is changed across the mode switching shift line, the controller 12 performs a cooperative shift as described below to perform switching between the high-speed mode-the low-speed mode.

In the cooperative shift, the controller 12 performs shifting of the sub-transmission mechanism 30 and changes the speed ratio of the variator 20 to an inverse direction from a direction to which the speed ratio of the sub-transmission mechanism 30 is changed. At this time, the inertia phase in which the speed ratio of the sub-transmission mechanism 30 actually changes and a time period in which the speed ratio of the variator 20 changes are synchronized. Changing the speed ratio of the variator 20 to the inverse direction from the speed ratio change of the sub-transmission mechanism 30 is to avoid an input rotation change, which is caused by a generation of a level difference in an actual through speed ratio, providing an uncomfortable feeling to a driver.

Specifically, when the operating point of the transmission 4 is changed across the mode switching shift line from the Low side to a High side, the controller 12 changes the gear position of the sub-transmission mechanism 30 from the first-speed to the second-speed (1-2 shift) and changes the speed ratio of the variator 20 to the Low side.

Conversely, when the operating point of the transmission 4 is changed across the mode switching shift line from the High side to the Low side, the controller 12 changes the gear position of the sub-transmission mechanism 30 from the second-speed to the first-speed (2-1 shift) and changes the speed ratio of the variator 20 to the High side.

In this embodiment, when the gear position of the sub-transmission mechanism 30 is changed from the first-speed to the second-speed on the basis of the first mode switching shift line, an hydraulic pressure with which a slippage starts in the Low brake 32 and an hydraulic pressure with which a torque transmission starts in the High clutch 33 are learned. This is because the hydraulic pressure with which the slippage starts in the Low brake 32 and the hydraulic pressure with which the torque transmission starts in the High clutch 33 are changed due to, for example, an aged deterioration. In the case where the learning is not performed, a shock generated when the gear position is switched possibly become large and a belt slip is possibly generated in the variator 20 due to a torque larger than a torque capacity of the variator 20 being input to the variator 20. To prevent these, the learning of the hydraulic pressure with which the slippage starts in the Low brake 32 and the hydraulic pressure with which the torque transmission starts in the High clutch 33 is performed.

Figure 4:
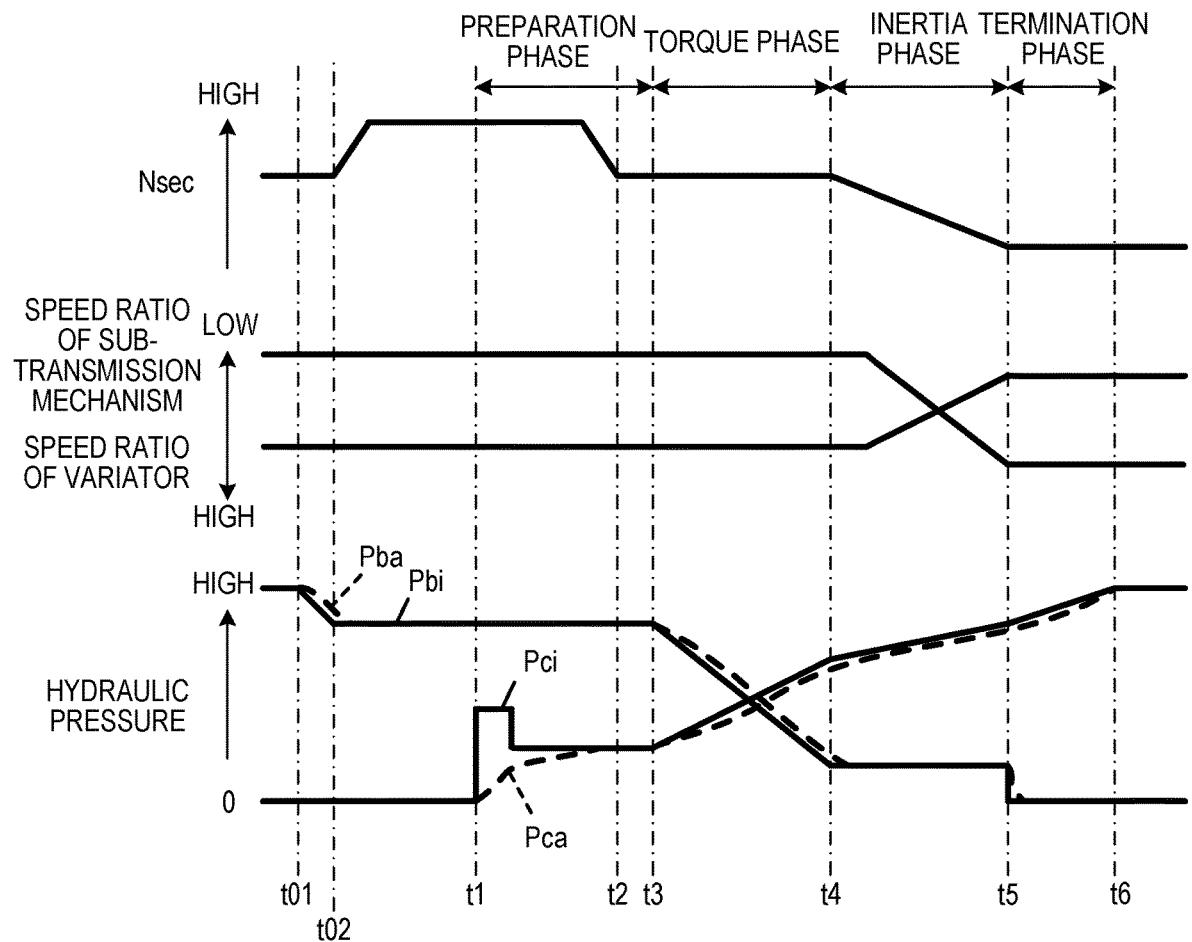
FIG. 4 is a timing chart indicating a hydraulic pressure change, etc. when a gear position of a sub-transmission mechanism is changed from a first-speed to a second-speed.

This learning is started before the operating point of the transmission 4 moves across the first mode switching shift line from the Low side to the High side. The learning will be described by referring to FIG. 4. FIG. 4 is a timing chart indicating a hydraulic pressure change, etc. when the gear position of the sub-transmission mechanism 30 is changed from the first-speed to the second-speed. The accelerator pedal opening APO and the vehicle speed VSP are constant. Here, the operating point of the transmission 4 is changed across the first mode switching shift line from the Low side to the High side at Time t1.

The learning of the hydraulic pressure with which the slippage starts in the Low brake 32 is started at Time t01 before Time t1. An instructed pressure Pbi of the Low brake 32 is gradually decreased. This gradually decreases an actual pressure Pba of the Low brake 32. The hydraulic pressure of the Low brake 32 in an engagement is set by considering a safety factor so as not to generate a slippage with respect to the torque input to the sub-transmission mechanism 30. Therefore, even the decrease of the instructed pressure Pbi of the Low brake 32 is started, it does not mean that the slippage is immediately generated in the Low brake 32. In FIG. 4, the instructed pressure Pbi of the Low brake 32 is indicated with a solid line and the actual pressure Pba of the Low brake 32 is indicated with a dashed line.

At Time t02, when the secondary rotation speed Nsec increases, it is determined that the slippage is generated in the Low brake 32 due to the decrease of the actual pressure Pba of the Low brake 32. The instructed pressure Pbi of the Low brake 32 at this time is learned as a hydraulic pressure with which the slippage starts in the Low brake 32.

At Time t1, the operating point of the transmission 4 is changed across the first mode switching shift line from the Low side to the High side, and the preparation phase is started. In the preparation phase, the precharging is performed. In the precharging, an instructed pressure Pci of the High clutch 33 is decreased down to a predetermined pressure after being increased once, and held at the predetermined pressure. An actual pressure Pca of the High clutch 33 is increased. In FIG. 4, the instructed pressure Pci of the High clutch 33 is indicated with a solid line and the actual pressure Pca of the High clutch 33 is indicated with a dashed line.

At Time t2, when the secondary rotation speed Nsec is decreased, it is determined that the torque transmission is started in the High clutch 33 due to the increase of the actual pressure Pca of the High clutch 33. From a torque transmission start timing and a changed speed of the secondary rotation speed Nsec after the preparation phase is started, the hydraulic pressure with which the torque transmission starts in the High clutch 33 is learned to correct a precharge pressure of the High clutch 33. For example, when the torque transmission start timing in the High clutch 33 is late, the precharge pressure is corrected to be high.

Thereafter, the torque phase is started at Time t3, the inertia phase is started at Time t4, the termination phase is started at Time t5, and the shift of the transmission 4 is terminated at Time t6.

Figure 5:
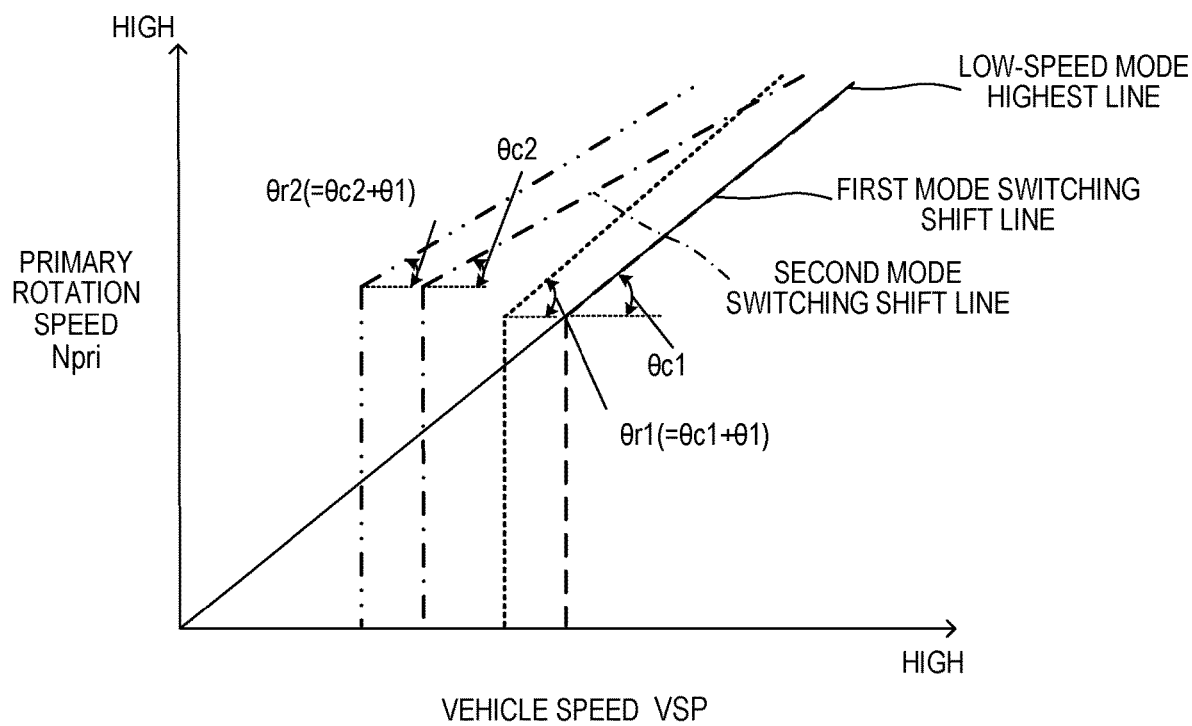
FIG. 5 is an enlarged map of a part in FIG. 3.

Thus, the learning requires a certain amount of time; therefore, the learning is started before the operating point of the transmission 4 moves across the first mode switching shift line from the Low side to the High side. In this embodiment, a learning start shift line is set as indicated with a dashed line in FIG. 5. As soon as the operating point of the transmission 4 moves across the learning start shift line, the learning is started. FIG. 5 is an enlarged drawing of a part of the shift map in FIG. 3 in a low vehicle speed side. The learning start shift line offsets to the low vehicle speed side with respect to the first mode switching shift line, and additionally, is set to the Low side with respect to the first mode switching shift line. An angle $\theta r1$ of the learning start shift line from the horizontal axis is set larger than an angle $\theta c1$ of the first mode switching shift line from the horizontal axis by a predetermined angle of $\theta 1$. The learning start shift line executes the learning and is set so as not to deteriorate the Low brake 32 by preventing the Low brake 32 from being held in a slippage state for long to restrain a heat generation of the Low brake 32. The first mode switching shift line is a shift line that prioritizes the above-described learning.

As illustrated in FIG. 3, in a region where the accelerator pedal opening APO is small, the second mode switching shift line is set such that the transmission 4 is changed to the high-speed mode from the low-speed mode in the Low side with respect to the first mode switching shift line, and in a region where the accelerator pedal opening APO is large, the second mode switching shift line is set so as to correspond to the first mode switching shift line. The second mode switching shift line does not intersect with the zero point on the lower-left corner in the shift map even though the second mode switching shift line is extended. Even when the transmission 4 is changed to the high-speed mode from the low-speed mode on the basis of the second mode switching shift line, the shift is performed in a state where the speed ratio of the variator 20 is small (the High side) when the accelerator pedal opening APO becomes large. This is because the shift shock becomes large if the sub-transmission mechanism 30 is shifted in a state where the speed ratio of the variator 20 is large (the Low side) when the accelerator pedal opening APO is large.

When the learning start shift line is disposed with respect to the second mode switching shift line, similarly to the first mode switching shift line, as indicated with a two-dot chain line in FIG. 5, an angle $\theta r2$ from the horizontal axis of the learning start shift line is set to larger than an angle $\theta c2$ from the horizontal axis of the second mode switching shift line by the predetermined angle of $\theta 1$. When the learning start shift line is set with respect to the second mode switching shift line, when the accelerator pedal opening APO is small, the learning is started in a state where the engine torque is unstable. Therefore, the torque input to the sub-transmission mechanism 30 is also unstable and it is impossible to distinguish whether the change of the secondary rotation speed Nsec in the learning of the Low brake 32 is generated by decreasing the hydraulic pressure of the Low brake 32 or generated by a torque variation. Accordingly, the learning of the Low brake 32 cannot be accurately performed.

When the learning start shift line is disposed with respect to the second mode switching shift line similarly to the first mode switching shift line, a distance between the second mode switching shift line and the learning start shift line of the second mode switching shift line becomes longer than the case of the first mode switching shift line as the accelerator pedal opening APO becomes large. Therefore, when the learning is started with the learning start shift line being set with respect to the second mode switching shift line, a period from when the learning is started to when the operating point of the transmission 4 moves across the second mode switching shift line becomes long. This causes a period from when the slippage is started in the Low brake 32 for the learning to when the gear position of the sub-transmission mechanism 30 is changed to the second-speed to be long. That is, the period in which the Low brake 32 is in the slippage state becomes long and the heat generation amount of the Low brake 32 becomes large, thereby possibly deteriorating the Low brake 32. When the accelerator pedal opening APO is at an extremely-low degree of opening, the period from when the learning is started to when the operating point of the transmission 4 moves across the second mode switching shift line becomes short due to an influence of, for example, an acceleration, and the shift of the sub-transmission mechanism 30 is started before the learning is completed, thereby possibly failing to perform the learning.

Therefore, in this embodiment, the learning start shift line is not set with respect to the second mode switching shift line, and when the second mode switching shift line is selected, the learning is not executed. The second mode switching shift line is a shift line that prioritizes improving the fuel efficiency with respect to the first mode switching shift line.

Figure 6:
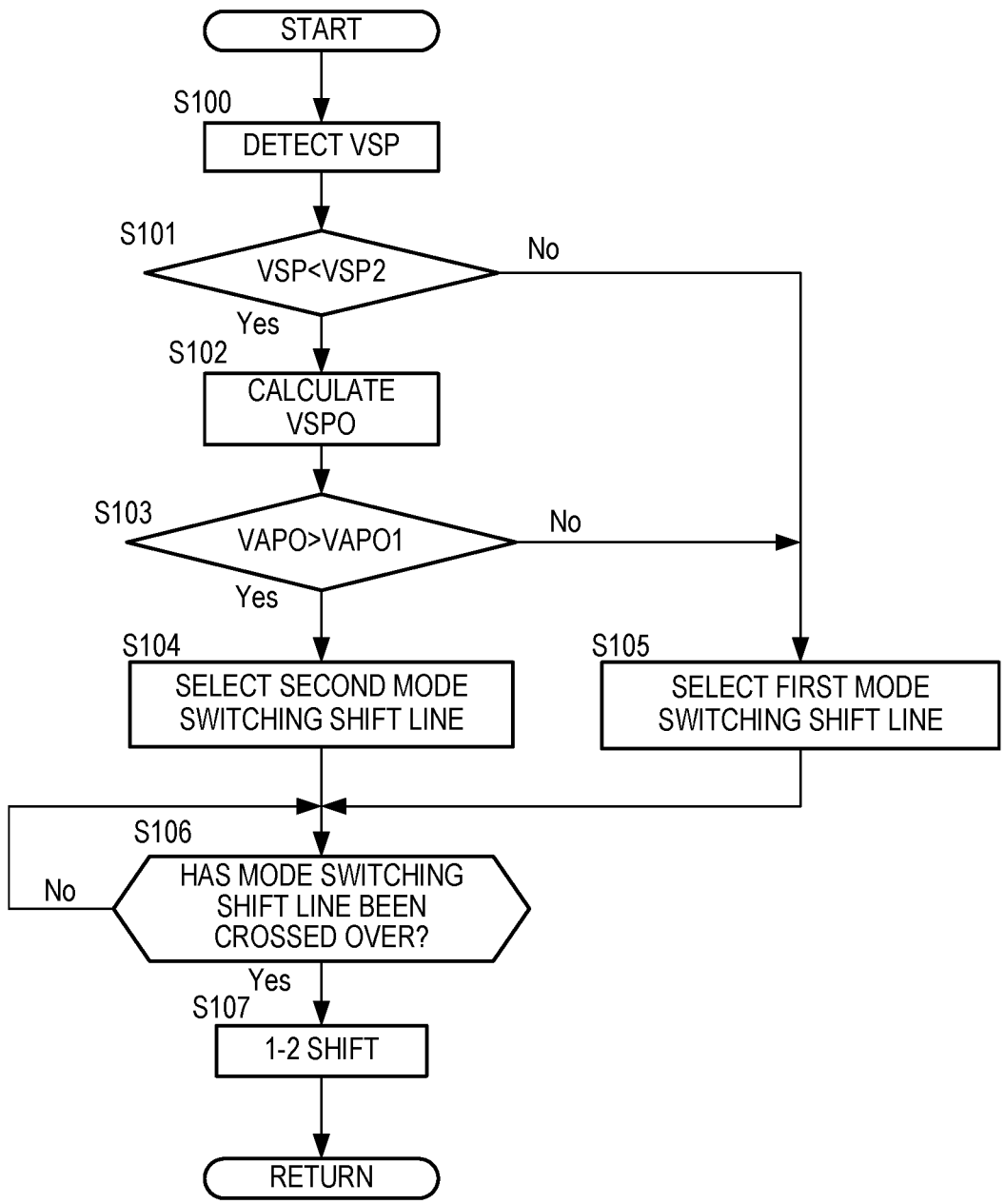
FIG. 6 is a flowchart describing a 1-2 shift control in the sub-transmission mechanism.

Next, the 1-2 shift control in the sub-transmission mechanism 30 of this embodiment will be described by referring to a flowchart in FIG. 6.

At Step S100, the controller 12 detects the vehicle speed VSP on the basis of the signal from the vehicle speed sensor 44.

At Step S101, the controller 12 determines whether the vehicle speed VSP is lower than a second predetermined vehicle speed VSP2. The second predetermined vehicle speed VSP2 is a vehicle speed lower than a minimum vehicle speed of the second mode switching shift line and is preliminarily set. The reason why the second predetermined vehicle speed VSP2 is set lower than the minimum vehicle speed of the second mode switching shift line is to complete the selection of the mode switching shift line before the vehicle speed VSP becomes the minimum vehicle speed of the second mode switching shift line. When the vehicle speed VSP is lower than the second predetermined vehicle speed VSP2, the process proceeds to Step S102. When the vehicle speed VSP is equal to or more than the second predetermined vehicle speed VSP2, the process proceeds to Step S105.

At Step S102, a varied speed VAPO of the accelerator pedal opening APO is calculated on the basis of the signal from the accelerator pedal opening sensor 41. Hereinafter, the varied speed VAPO when a depression amount of the accelerator pedal is decreased is referred to as an accelerator pedal returning speed VAPO. When the returning speed VAPO is in positive, the depression amount of the accelerator pedal is decreased. That is, the larger the decreased amount of depressing of the accelerator pedal is, the larger the returning speed VAPO becomes.

At Step S103, the controller 12 determines whether the accelerator pedal returning speed VAPO is smaller than the predetermined speed VAPO1. The predetermined speed VAPO1 is a value with which a determination can be made that the driver has an intention to decrease the depression amount of the accelerator pedal. When the accelerator pedal returning speed VAPO is larger than the predetermined speed VAPO1, and it is determined that the driver has performed, what is called, a foot return, the process proceeds to Step S104. When the returning speed VAPO of the accelerator pedal opening APO is smaller than the predetermined speed VAPO1, and it is determined that the driver has not performed the foot return, the process proceeds to Step S105.

At Step S104, the controller 12 selects the second mode switching shift line as the mode switching shift line.

At Step S105, the controller 12 selects the first mode switching shift line as the mode switching shift line.

At Step S106, the controller 12 determines whether the operating point of the transmission 4 has been changed across the selected mode switching shift line. When the operating point of the transmission 4 has been changed across the selected mode switching shift line, the process proceeds to Step S107.

At Step S107, the controller 12 changes the gear position of the sub-transmission mechanism 30 from the first-speed to the second-speed, and the cooperative shift is performed in association with this to change the speed ratio of the variator 20 to the Low side. When the first mode switching shift line is selected as the mode switching shift line, the above-described learning is performed.

It should be noted that when the gear position of the sub-transmission mechanism 30 being changed from the first-speed to the second-speed is terminated or when the vehicle is stopped, the selected mode switching shift line is reset.

Effects of the embodiment of the present invention will be described.

As the mode switching shift line to switch the gear position of the sub-transmission mechanism 30, the first mode switching shift line, which prioritizes the learning of the hydraulic pressure with which the slippage is started in the Low brake 32 and the learning of the hydraulic pressure with which the torque transmission is started in the High clutch 33, and the second mode switching shift line, which is in the Low side with respect to the first mode switching shift line and prioritizes the fuel efficiency, are selectable. The gear position of the sub-transmission mechanism 30 is switched on the basis of the selected mode switching shift line. This ensures performing the learning of the hydraulic pressure with which the slippage is started in the Low brake 32 and the hydraulic pressure with which the torque transmission is started in the High clutch 33, and improving the fuel efficiency of the engine 1.

Selecting the mode switching shift line on the basis of the vehicle speed VSP and the accelerator pedal returning speed VAPO ensures selecting the mode switching shift line corresponding to the vehicle operating state, thereby ensuring accurately performing the learning.

When the vehicle speed VSP is smaller than the second predetermined vehicle speed VSP2 and the accelerator pedal returning speed VAPO is larger than the predetermined speed VAPO1, the second mode switching shift line is selected as the mode switching shift line. This ensures terminating the selection of the mode switching shift line before the operating point of the transmission 4 moves across the second mode switching shift line and selecting an appropriate mode switching shift line (an effect corresponding to claim 3). When the accelerator pedal returning speed VAPO is large and the torque variation input to the transmission 4 is large, the learning cannot be accurately performed. Therefore, in such case, selecting the second mode switching shift line, which prioritizes the fuel efficiency, as the mode switching shift line ensures improving the fuel efficiency.

When the learning is performed, after learning the hydraulic pressure with which the slippage is started in the Low brake 32, the learning of the hydraulic pressure with which the torque transmission is started in the High clutch 33 is performed. This ensures terminating the learning in the step where the gear position of the sub-transmission mechanism 30 is changed from the first-speed to the second-speed, thus ensuring executing the learning without providing the uncomfortable feeling to the driver.

When the second mode switching shift line is selected as the mode switching shift line, the learning is not performed. This ensures accurately performing the learning.

The embodiment of the present invention described above is merely illustration of a part of application example of the present invention and not of the nature to limit the technical scope of the present invention to the specific constructions of the above embodiment.

The present application claims a priority of Japanese Patent Application No. 2015-064804 filed with the Japan Patent Office on Mar. 26, 2015, all the contents of which are hereby incorporated by reference.

The invention claimed is:

1. A control device for a continuously variable transmission, the control device controlling a continuously variable transmission including a continuously variable transmission mechanism configured to continuously change a speed ratio and a sub-transmission mechanism configured to select a first gear position or a second gear position having a speed ratio smaller than the first gear position by engaging or disengaging a plurality of friction engaging elements, the control device comprising a controller configured to:
select a first shift line or a second shift line as a shift line in switching from the first gear position to the second gear position, the first shift line prioritizing a learning of a hydraulic pressure with which a friction engaging element engaged at the first gear position starts to slip and a learning of a hydraulic pressure with which a friction engaging element engaged at the second gear position starts to transmit a torque, the second shift line being a shift line in a Low side with respect to the first shift line, the second shift line prioritizing a fuel efficiency of a driving source; and
switch the sub-transmission mechanism from the first gear position to the second gear position on the basis of the selected shift line.

2. The control device for the continuously variable transmission according to claim 1, wherein
the controller selects the first shift line or the second shift line on the basis of a vehicle speed and an accelerator pedal returning speed.

3. The control device for the continuously variable transmission according to claim 2, wherein
the controller selects the second shift line when the vehicle speed is smaller than a predetermined vehicle speed smaller than a minimum vehicle speed in the second shift line and the accelerator pedal returning speed is larger than a predetermined speed.

4. The control device for the continuously variable transmission according to claim 1, wherein
the controller performs a first learning and a second learning, the first learning learning a hydraulic pressure with which a friction engaging element engaged at the first gear position starts to slip, the second learning learning a hydraulic pressure with which a friction engaging element engaged at the second gear position starts to transmit a torque, and
performs the second learning after performing the first learning.

5. The control device for the continuously variable transmission according to claim 4, wherein
the controller is further configured to avoid performing the first learning and the second learning when the second shift line is selected.

6. A control method for a continuously variable transmission, the control method controlling a continuously variable transmission including a continuously variable transmission mechanism configured to continuously change a speed ratio and a sub-transmission mechanism configured to select a first gear position or a second gear position having a speed ratio smaller than the first gear position by engaging or disengaging a plurality of friction engaging elements, the control method comprising:
selecting a first shift line or a second shift line as a shift line in switching from the first gear position to the second gear position, the first shift line prioritizing a learning of a hydraulic pressure with which a friction engaging element engaged at the first gear position starts to slip and a learning of a hydraulic pressure with which a friction engaging element engaged at the second gear position starts to transmit a torque, the second shift line being a shift line in a Low side with respect to the first shift line, the second shift line prioritizing a fuel efficiency of a driving source; and
switching the sub-transmission mechanism from the first gear position to the second gear position on the basis of the selected shift line.

7. A control device for a continuously variable transmission, the control device controlling a continuously variable transmission including a continuously variable transmission mechanism configured to continuously change a speed ratio and a sub-transmission mechanism configured to select a first gear position or a second gear position having a speed ratio smaller than the first gear position by engaging or disengaging a plurality of friction engaging elements, the control device comprising:
selection means for selecting a first shift line or a second shift line as a shift line in switching from the first gear position to the second gear position, the first shift line prioritizing a learning of a hydraulic pressure with which a friction engaging element engaged at the first gear position starts to slip and a learning of a hydraulic pressure with which a friction engaging element engaged at the second gear position starts to transmit a torque, the second shift line being a shift line in a Low side with respect to the first shift line, the second shift line prioritizing a fuel efficiency of a driving source; and
switching means for switching the sub-transmission mechanism from the first gear position to the second gear position on the basis of the shift line selected by the selection means.

* * * * *